United States Patent [19]

Luckanuck

[11] Patent Number: 4,746,555
[45] Date of Patent: May 24, 1988

[54] FIRE RETARDANT COMPOSITION

[75] Inventor: John S. Luckanuck, Burlington, Canada

[73] Assignee: Radixx/World Ltd., Ontario, Canada

[21] Appl. No.: 19,512

[22] Filed: Feb. 26, 1987

[30] Foreign Application Priority Data

Apr. 4, 1986 [CA] Canada .................................. 505878

[51] Int. Cl.⁴ ......................... B27N 5/02; C09D 5/16; E04B 1/74
[52] U.S. Cl. ..................................... 428/35; 428/526; 428/920; 428/921; 106/18.12; 106/84; 252/62
[58] Field of Search ................. 252/62; 106/18.12, 84; 428/35, 526, 920, 921

[56] References Cited

U.S. PATENT DOCUMENTS

| | | |
|---|---|---|
| 2,921,862 | 1/1960 | Sucetti .................................. 106/88 |
| 2,993,016 | 7/1961 | Sucetti .................................. 260/15 |
| 3,015,626 | 1/1962 | Kingsbury . |
| 3,658,564 | 4/1972 | Gerow et al. . |
| 3,725,095 | 4/1973 | Weidman et al. . |
| 3,847,633 | 11/1974 | Race ...................................... 106/98 |
| 4,040,213 | 8/1977 | Capaul ................................. 52/145 |
| 4,066,463 | 1/1978 | Chollet .......................... 106/15 FP |
| 4,095,985 | 6/1978 | Brown . |
| 4,595,414 | 6/1986 | Shutt ................................ 106/18.16 |

Primary Examiner—John E. Kittle
Assistant Examiner—Patrick J. Ryan

[57] ABSTRACT

The present invention provides a composition for use in forming a fire retardant core for a wooden door by curing and pressing said composition to form a sheet, said composition consisting essentially of (a) 30 to 75% by weight of an inert mineral filler selected from perlite and vermiculite; (b) 10 to 30% by weight of wood chips and (c) from 3 to 15% by weight of a binder which is a mixture of an alkali metal silicate and a curable phenolic resin, at least one of which is present in dry form.

42 Claims, 1 Drawing Sheet

U.S. Patent May 24, 1988 4,746,555
FIG. 1
FIG. 2
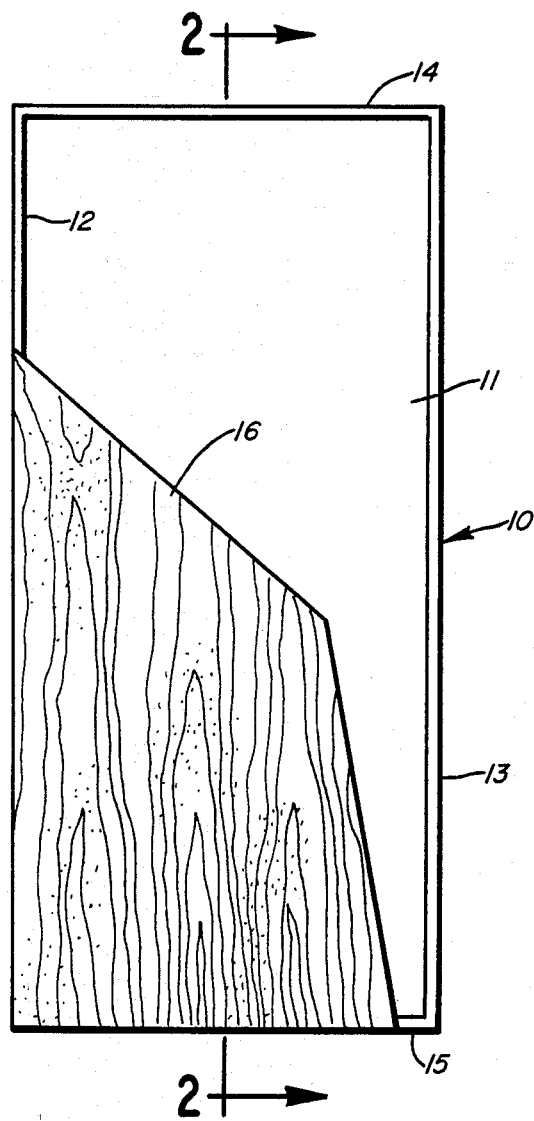
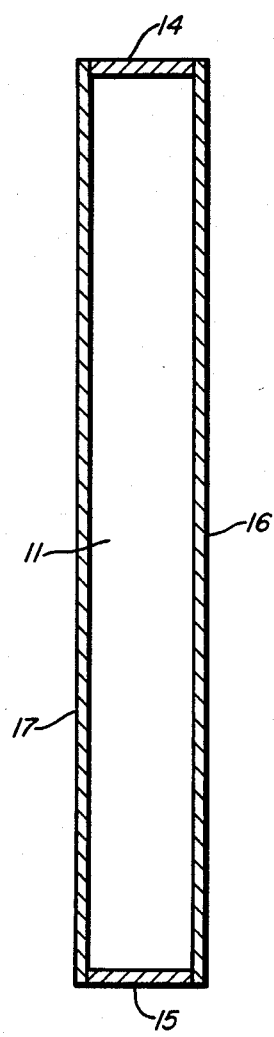

FIRE RETARDANT COMPOSITION

The present invention relates to a fire retardant core for use in a wooden door as well as a wooden door containing said core. The present invention further relates to a fire retardant composition for use in manufacturing said core and a method of manufacturing said core using said composition.

The present invention further relates to a fire retardant panel formed from said composition as well as wooden panels such as waferboard and particleboard panels coated with such a fire retardant composition.

In order to meet fire regulations which obtain in the Provinces of Canada and the States of the United States of America it is necessary for wodden doors in buildings particularly in commercial buildings and buildings used by the public to meet certain standards of fire retardancy. In particular they must be able to withstand the fire endurance test as provided by the Underwriters Laboratories of Canada, UL10B test (ASTM E-152 ULCS104 and NFPA 252). In such a test the door is subjected to a direct flame at about 3000° to 3500° F. for at least 1½ hours and at the termination of the application of the flame it is subjected to a firemen's hose stream at close range for a minimum period of time of at least 16 seconds. At the end of such a test it must still maintain its integrity and not disintegrate. Wooden doors have inter alia been made by gluing a core into a wooden frame made, for example, of birch, soft maple, or elm and gluing a facing of, for example, three ply hardwood or soft veneer plywood on either side thereof. Heretofore, in order to meet the aforesaid Underwriters Laboratories endurance test such a core has been made from gypsum-perlite mixtures. Cores made from this mixture resemble ordinary plaster board and are difficult to work with. They readily crack and crumble during handling and also have extremely poor screwholding ability. In doors, particularly fire doors, this lack of screwholding ability requires special measures to be taken to mount hinges and other fittings and as a result the fire retardant properties of the door are adversely affected. The cores also tend to be rather heavy and cumbersome and the weight factor makes such cores unsuitable for use in certain doors.

The object of the present invention is to provide a core for use in a wooden door which is capable of meeting the requirements of the underwriters tests as set forth above, and at the same time have excellent screwholding ability. It is a further object of the present invention to provide a process for producing such a core and also a composition for making such a core.

It is a further object of the present invention to provide panels made from such a composition and also to provide panels made from a combustible material such as particleboard and waferboard coated with a thin layer of such a composition to provide for fire retardancy.

According to the present invention, therefore, there is provided a fire retardant core for a wooden door which is a cured and pressed sheet of a composition consisting essentially of (a) 30 to 75% by weight of an inert mineral filler selected from perlite and vermiculite, (b) 10 to 30% by weight of wood chips and (c) 3 to 15% by weight of a binder, said binder being a mixture of an alkali metal silicate and a curable phenolic resin, at least one of which is in dry form.

The present invention also provides a door comprising a frame having bonded therein, a fire retardant core as set forth above with a wooden facing glued on either side thereof.

The present invention still further provides a composition for the use in the manufacture of a fire retardant core for a wooden door, consisting essentially of (a) 30 to 75% by weight of an inert mineral filler selected from perlite and vermiculite (b) 10 to 30% by weight of wood chips and (c) from 3 to 15% by weight of a binder, which is a mixture of an alkali metal silicate and a curable phenolic resin, at least one of which is in dry form.

The present invention still further provides a method of making such a fire retardant core which comprises mixing together wood chips, phenolic resin, alkali metal silicate and a mineral filler, selected from perlite and vermiculite, so as to produce a composition comprising 30 to 75% by weight of the inert mineral filler, 10 to 30% by weight of the wood chips and from 3 to 15% by weight of the binder, at least one of the phenolic resin and the alkali metal silicate being in dry form.

It is a critical feature of the present invention that in order to provide the necessary strength for the door, particularly when subjected to the high pressure from the firemen's men's hose and also to provide necessary rigidity in the door and more particularly to provide the required screwholding power, that the wood chips are in the form of chips as opposed to fibers, whereby the wood chips in the core overlap one another. It is found that with wood fibers the strength of the door and the rigidity of the door and in particualar the screwholding ability of the door are unsatisfactory. The wood chips are suitably present in an amount of from 10 to 30% by weight of the composition and are preferably present in an amount from 20 to 30% by weight of the composition.

The use as binder of a combination of alkali metal silicate, particularly sodium or potassium silicate, and more particularly sodium silicate on the grounds of economy, is critical to the present invention. It is found that besides such binder contributing to the strength of the core, when the core is subjected to flame at a temperature of 1850° F., the binder intumesces and forms a ceramic layer on the surface of the core which is water impervious and provides the core with sufficient strengthening integrity and lack of porosity that when subsequently subjected to the high pressure from the firemen's hose the integrity of the door containing the core is maintained. Thus the phenolic resin is water resistant, per se, and provides some fire retardancy to the core and the silicate itself is fire retardant and at the same time gives strength to the core. In particular, subjecting the composition to high pressure temperatures of the order of 1550° C., the phenolic resin is cured to give high strength to the door and rigidity to the door after being subjected to the flame endurance test, so as to withstand the water blast from the firemen's hose. Without the phenolic resin or the silicate, the door, after the fire endurance test, will not withstand the high pressure from the firemen's hose and disintegrate. The binder is suitably present in an amount from 3 to 15% by weight with the silicate being suitably present in an amount from 3 to 10% by weight, more preferably 3 to 7% by weight and the phenolic resin suitably being present in an amount from 6 to 10% by weight and more preferably 6 to 8% by weight. It is further critical to the present invention that in forming the composition at least one of the silicate and the phenolic resin is in dry form, for it is found that when the phenolic resin is in liquid form and the silicate is in liquid form a gel immediately forms on mixing the two and prevents the formation of the core of the present invention. Suitably the phenolic resin is in dry form and the silicate is in liquid form, such as the form of waterglass. As phenolic resin any cureable synthetic thermosetting phenolic resin may be used, such as a phenol aldehyde resin obtained by the condensation of phenol or a substituted phenol with an aldehyde, such as for example formaldehyde, or furfural. Preferably the phenol resin is in a phenol formaldehyde resin, such as that supplied under the trademark Bakelite PF911.

The alkali metal silicate from an economical point of view is preferably potassium silicate or sodium silicate. The silicates are used in the form of liquids suitably in admixture with water. As potassium silicates there may be used those supplied under the trademark KASIL by the PQ Corporation such as KASIL 1, KASIL 88 and KASIL 6. Sodium silicates include those supplied by National Silicates Limited under the trademark SS, SS65, G, SSC and GD and Metso and Metso beads 2048, Metso pentabead 20 and Metso 20 supplied by the P.Q. Corporation and those soluble silicates supplied by National Silicates Ltd. under the trademarks R, N, E, O, K, M, STAR, R, U, D and C and BWND49 which are sodium silicates solutions, the former being sodium silicate solid powders. The Metso silicates are crystaline alkaline sodium silicates. The preferred alkali metal silicate from an economical point of view is sodium silicate, suitably in the form of waterglass.

The vermiculite and perlite serve the purpose of fillers for the composition providing both bulk and fire retardancy to the composition. Vermiculite is a clay mineral constituent and is hydrogenated magnesium aluminum iron silicate of platelet type crystalline structure and Perlite is a volcanic glass. Either can be used as the filler both providing fire retardancy. However, vermiculite tends to disintegrate at about 1500° C. and its insulating properties thus tend to deteriorate. In contrast thereto perlite is stable up to 1850° to 1900° C. and is of lightweight structure. Therefore, excess of perlite tends to give the composition too much bulk for use in the subsequent pressing and curing operations in forming the core and the presence of vermiculite tends to lower the heat insulating properties of the core. Generally a combination of the vermiculite and perlite is desirable as the mineral filler. Suitably the perlite is present in a range from 5 to 15% by weight and the vermiculite is present in an amount from 50 to 65% by weight. The composition which is a powdery composition, may contain water in an amount to about 5% by weight to keep the dusting of the composition down when forming the composition and making the core.

The manufacture of the door cores from the composition merely requires slight modification of the conventional process for forming waferboard and particleboard such that in the drum mixer of the waferboard plant there is admixed with the wood chips from the chipper and from the kiln dryer the other components of the mixture namely, the silicate, the phenolic resin, the perlite and/or vermiculite. These components are then mixed in the drum mixer and poured into trays, suitably 8 by 16 by 14 trays, which are then passed in stacks into presses where the composition is pressed to the desired thickness at a temperature of about 1550° F. to form the core with simultaneous curing of the phenolic resin. It has been found desirable when forming thicker door cores from half an inch to three quarters of an inch to provide two door cores from the presses of less than ½ inch and laminate them together. This facilitates full curing of the resin in the individual thinner cores which are laminated together.

While the composition of the present invention has its primary use in forming fire retardant door cores which will meet the requirements of the fire regulations in the Provinces and States in North America, it may of course also be used for forming building panels if so desired by a similar moulding process as in the waferboard plant or can also be used as a coating on conventional waferboard, other wood boards such as particleboard or other boards of highly combustible material to provide such board with fire retardancy and may be applied to one or both surfaces of the board.

According to a further aspect thereof the present invention provides a fire retardant building panel which is a cured and pressed sheet of a composition consisting essentially of (a) 30 to 75% by weight of an inert mineral filler selected from perlite and vermiculite; (b) 10 to 30% by weight of wood chips and (c) from 3 to 15% by weight of a binder which is a mixture of an alkali metal silicate and a curable phenolic resin, at least one of which is present in dry form.

The present invention will be further illustrated by way of the following Examples:

EXAMPLE 1

A fire retardant composition was made up from the following ingredients: in the following percentages by weight:

| | | |
|---|---|---|
| perlite | | 10% by weight |
| vermiculite | | 50% by weight |
| wood chips | | 26% by weight |
| dry phenolic resin (Bakelite PF 311) | | 8% by weight |
| liquid sodium silicate (waterglass) | | 3% by weight |
| and water | | 3% by weight |
| | Total | 100% by weight |

The mixture was formed in a drum mixer of a conventional waferboard plant and then cast into trays and compressed in the presses of the waferboard plant and at conventional pressures and at temperatures of about 1550° F. to cure the phenolic resin. The boards were ¾ inch thick and were cut to size to form door cores. In face screw-holding strength determenants on a door frame from said cores which consisted of a wooden stile (14½"×1"×1½") which was bonded to the door core (14½"×7"×1½") according to CSA Standard can 3-0188; O M78 (Standard Test Methods for Mat-formed Wood Particleboards and Waferboards) a specimen 6"×3" was cut out of the core material drilled with a 7/64" drill bit and a screw 3" long with a shaft diameter of 0.17 inches was screwed into the hole. The screw was withdrawn perpendicular to the plane of the panel in an Instron testing machine at a crosshead speed of 0.6 inches per minute. The test sample was found to have a face screwholding strength of 213 pounds. The door cores were then subjected to a fire endurance test on wooden doors in accordance with CAN4-S104 and ASTME 152 for a 45 minute rating.

EXAMPLE 2

In a 1.5 hour endurance/hose stream screen test conducted by the Ontario Research Foundation on a door consisting of a 1⅜ inch inch thick core prepared according to Example 1 between two 3/16 birch panels using the UL 10(b) time/temperature curve, the unexposed surface temperature and performance test for 90 minutes followed by a hose stream test was conducted. This test provided preliminary data prior to a full scale UL 10(b) test (ASTM E-152, ULC-S104, NFPA-252). A small scale fire endurance furnace was designed to operate under the same time-temperature curve as the large scale ASTM E-119 furnace and could be used as a screening test for ASTM E-119 with the following provisos: The only parameter determined is the heat transmission through the assembly as measured by the temperature rise on the unexposed surface. The assembly is not restrained and is not loaded. The small scale furnace (1 cubic meter interior volume) was operated in the wall mounting mode. The edges were packed with Fibrefax ceramic insulation. Six 18 gauge, type K thermocouples were taped to the unexposed surface. Thermocouples were positioned 300 mm in from each corner, another in the centre and another centred along the top row. The furnace consists of eight gas burners controlled by a Hewlett Packard HP-85/3497A Data Logger system which scans the furnace thermocouple every 30 seconds, to 10 minutes, and then every 60 seconds thereafter. Following each scan, the system either turns on or off various burners so as to control the furnace temperature to within the ±10% time-temperature curve area as defined by E-119. In fact, after the first 5 minutes, the furnace controls to within ±3%, and after 10 minutes to within ±2%.

Paragraph 28.1.2 of ASTM E-119 states: "Transmission of heat through the specimen during the classification period shall not have been such as to raise the average temperature on its unexposed surface more than 250° F. (139° C.) above its initial temperature".

If, during this period, any individual thermocouple exceeds 30% of the specified limit then, according to paragraph 5.4, this time shall be specified as the end point.

After 4.5 minutes into the test the unexposed birch facing burned actively. After 51 minutes the unexposed surface heat transmission end point reached 169° C. versus 25°+139° C. therefore fire endurance rating equals 50 minutes. After 77 minutes the birch facing under the thermocouple pads reaches ignition point and begins to flame. Thermocouples and pads are then removed and the flames extinguished with a light water spray from a spray bottle. Between 77 and 89 minutes sporadic breakout of flames on the birch facing necessitated periodic extinguishment. After 90 minutes the fire endurance test was terminated, panel demounted and trolleyed outside within 25 seconds and after 90.4 minutes the hose stream test was conducted for 16 seconds. The core material remained intact during the 1½ hour fire exposure and essentially intact as a result of the hose stream test. A small area of the left corner approximately 0.25 inches deep was ablated off by the hose stream. The panel thus completely satisfied the above test.

DESCRIPTION OF THE DRAWING

The invention is illustrated in the accompanying drawing, in which

FIG. 1 is a front elevational view, partially broken away, of a fire retardant door formed in accordance with the invention; and FIG. 2 is a sectional view taken along the line 2—2 of FIG. 1.

A door 10 includes a core 11 formed as previously described which is enclosed by wooden stiles 12 and 13 and top and bottom wood rails 14 and 15 which are bonded to the sides of the core. The front and rear faces of the door are formed by veneer panels 16 and 17 which are bonded to the core and the wood frame.

While in the foregoing specification a detailed description of specific embodiments of the invention were set forth for the purpose of illustration, it will be understood that many of the details herein given may be varied considerably by those skilled in the art without departing from the spirit and scope of the invention.

I claim:

1. A fire retardant core for a wooden door which is a cured pressed sheet of a composition consisting essentially of (a) 30 to 75% by weight of an inert mineral filler selected from perlite and vermiculite; (b) 10 to 30% by weight of wood chips and (c) from 3 to 15% by weight of a binder which is a mixture of an alkali metal silicate and a curable phonolic resin, at least one of which is present in dry form.

2. A core as claimed in claim 1, in which the mineral filler is present in an amount from 60 to 70% by weight.

3. A core as claimed in claim 2, in which the mineral filler is a mixture of vermiculite and perlite, the vermiculite being present in an amount of 50 to 65% by weight and the perlite being present in an amount from 5 to 15% by weight.

4. A core as claimed in claim 2, in which the wood chips are present in an amount of 20 to 30% by weight.

5. A core as claimed in claim 4, in which the phenolic resin is present in an amount of 6 to 10% by weight and the alkali metal silicate is in an amount from 3 to 10% by weight.

6. A core as claimed in claim 5, in which the silicate is present in an amount from 3 to 7% by weight.

7. A core as claimed in claim 4, in which the alkali metal silicate is sodium or potassium silicate.

8. A core as claimed in claim 4, in which the alkali metal silicate is sodium silicate.

9. A core as claimed in claim 4, in which the alkali metal silicate is waterglass.

10. A core as claimed in claim 8, in which the phenolic resin is phenol formaldehyde resin.

11. A core as claimed in claim 8, in which the sodium silicate is wet and the phenolic resin is dry.

12. A door comprising a frame having bonded therein a fire retardand core as claimed in claim 1, said door having a wooden facing glued thereon.

13. A composition for use in forming a fire retardant core for a wooden door by curing and pressing said composition to form a sheet, said composition consisting essentially of (a) 30 to 75% by weight of an inert mineral filler selected from perlite and vermiculite; (b) 10 to 30% by weight of wood chips and (c) from 3 to 15% by weight of a binder which is a mixture of an alkali metal silicate and a curable phonolic resin, at least one of which is present in dry form.

14. A composition as claimed in claim 13, in which the mineral filler is in an amount from 60 to 70% by weight.

15. A composition as claimed in claim 14, in which the mineral filler is a mixture of vermiculite and perlite, the vermiculite being present in an amount of 50 to 65% by weight and the perlite being present in an amount from 5 to 15% by weight.

16. A composition as claimed in claim 15, in which the wood chips are present in an amount of 20 to 30% by weight.

17. A composition as claimed in claim 16, in which the phenolic resin is present in an amount from 3 to 10% by weight.

18. A composition as claimed in claim 17, in which the silicate is present in an amount from 3 to 7% by weight.

19. A composition as claimed in claim 18, in which the alkali metal silicate is sodium or potassium silicate.

20. A composition as claimed in claim 19, in which the alkali metal silicate is sodium silicate.

21. A composition as claimed in claim 20, in which the alkali metal silicate is waterglass.

22. A composition as claimed in claim 21, in which the resin is a phenol formaldehyde resin.

23. A composition as claimed in claim 22, in which the sodium silicate is wet and the phenolic resin is dry.

24. A panel formed from a combustible material coated on at least one side thereof with a thin layer of a cured composition as claimed in claim 14.

25. A wooden panel coated on at least one side thereof with a thin layer of a cured composition as claimed in claim 13.

26. A waferboard or particleboard panel coated on at least one side thereof with a thin layer of a cured composition as claimed in claim 14.

27. A method of making a fire retardant core which comprises mixing together wood chips, phenolic resin, alkali metal silicate and at least one mineral filler selected from perlite and vermiculite, so as to produce a composition comprising (a) 30 to 75% by weight of an inert mineral filler selected from perlite and vermiculite; (b) 10 to 30% by weight of wood chips and (c) from 3 to 15% by weight of a binder which is a mixture of an alkali metal silicate and a curable phenolic resin, depositing said mixture into trays, passing said trays into a press and pressing said mixture at elevated pressure and temperature efficient to cause said phenolic resin to cure and form said core.

28. A method as claimed in claim 27, in which the alkali metal silicate is sodium silicate.

29. A method as claimed in claim 28, in which said sodium silicate is wet and said phenolic resin is dry.

30. A method as claimed in claim 29, in which the sodium silicate is waterglass.

31. A method as claimed in claim 30, in which the pressing temperature is about 1550° F.

32. A method as claimed in claim 31, in which a pair of cores are subsequently laminated to form a thicker core.

33. A fire retardant building panel which is a cured and pressed sheet of a composition consisting essentially of (a) 30 to 75% by weight of an inert mineral filler selected from perlite and vermiculite; (b) 10 to 30% by weight of wood chips and (c) from 3 to 15% by weight of a binder which is a mixture of an alkali metal silicate and a curable phenolic resin, at least one of which is present in dry form.

34. A panel according to claim 33, in which the mineral filler is present in an amount from 60 to 70% by weight.

35. A panel according to claim 34, in which the mineral filler is a mixture of vermiculite and perlite, the vermiculite being present in an amount of 50 to 65% by weight and the perlite being present in an amount from 5 to 15% by weight.

36. A panel according to claim 34, in which the wood chips are present in an amount of 20 to 30% by weight.

37. A panel according to claim 36, in which the phenolic resin is present in an amount of 6 to 10% by weight and the alkali metal silicate is in an amount from 3 to 10% by weight.

38. A panel according to claim 37, in which the silicate is present in an amount from 3 to 7% by weight.

39. A panel according to claim 36, in which the alkali metal silicate is sodium or potassium silicate.

40. A panel according to claim 36, in which the alkali metal silicate is sodium silicate.

41. A panel according to claim 36, in which the alkali metal silicate is waterglass.

42. A panel according to claim 40, in which the phenolic resin is a phenol formaldehyde resin.

* * * * *